United States Patent [19]
Brown

[11] 3,944,020
[45] Mar. 16, 1976

[54] SPEAKER HEADREST FOR MOTOR VEHICLES

[76] Inventor: Ronald Leroy Brown, 6485 W. 3860 South, Salt Lake City, Utah 84120

[22] Filed: July 17, 1974

[21] Appl. No.: 489,357

[52] U.S. Cl. ............ 181/141; 179/146 H; 181/145; 181/153; 181/199
[51] Int. Cl.² G10K 10/00; H05K 5/00; H04M 1/04
[58] Field of Search ............ 181/199, 144, 145, 148, 181/153, 141; 179/146 H, 156 R

[56] References Cited
UNITED STATES PATENTS

| | | | |
|---|---|---|---|
| 1,851,208 | 3/1932 | Nicolson | 179/146 H |
| 3,026,955 | 3/1962 | Wilber | 181/153 |
| 3,303,279 | 2/1967 | Tinklepaugh | 179/146 H |
| 3,512,605 | 5/1970 | McCorkle | 181/141 |

FOREIGN PATENTS OR APPLICATIONS 827,306  2/1960  United Kingdom............ 179/146 H

*Primary Examiner*—Stephen J. Tomsky
*Attorney, Agent, or Firm*—Criddle & Thorpe

[57] ABSTRACT

A stereophonic speaker headrest for motor vehicles includes a rigid interior shell and a padded cover. The rigid interior shell is generally hollow with a pair of opposed side wing members having speaker attachment structure therein for holding a speaker in each wing. The hollow portion of the rigid interior shell adjacent the speaker attachment structure forms an acoustic chamber. The padded cover provides substantial padding over the front and rear surfaces of the rigid interior shell, including the area in front of the speakers.

10 Claims, 7 Drawing Figures

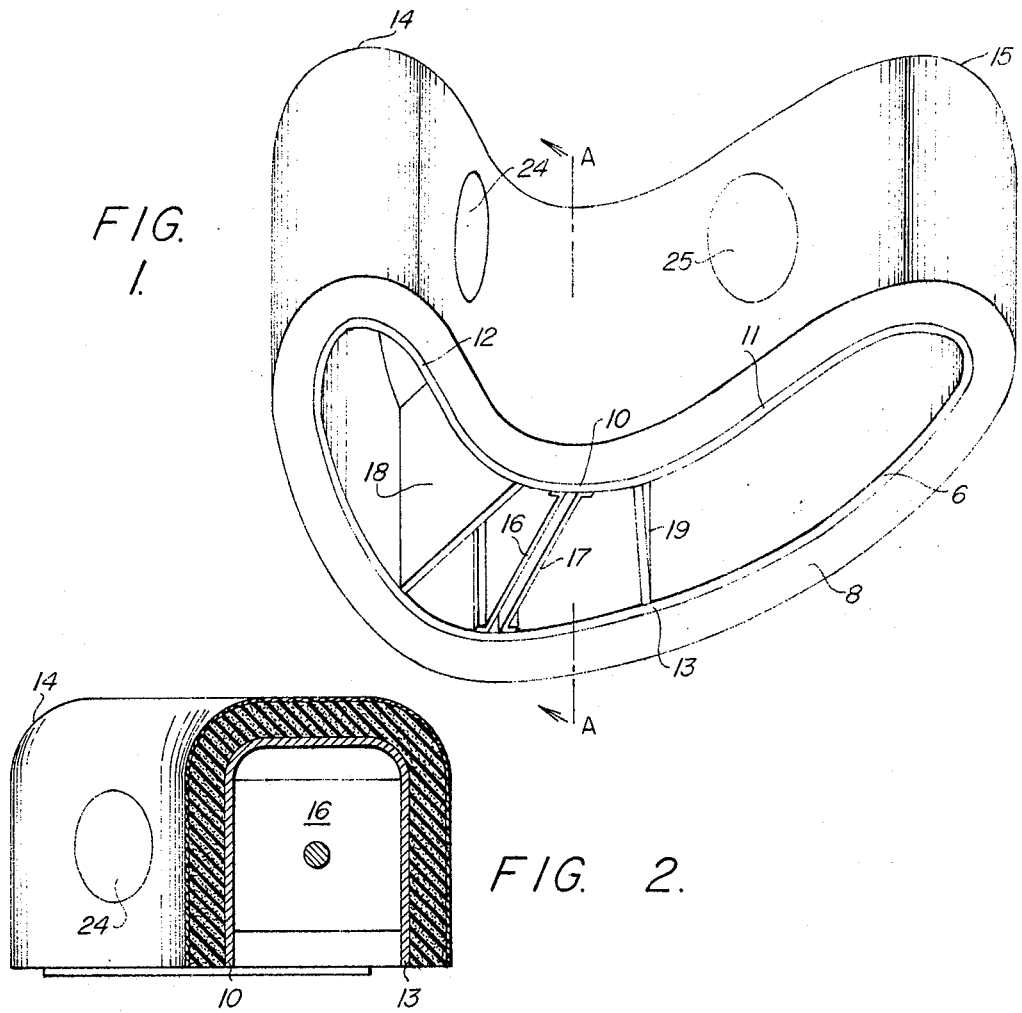
FIG. 1.
FIG. 2.
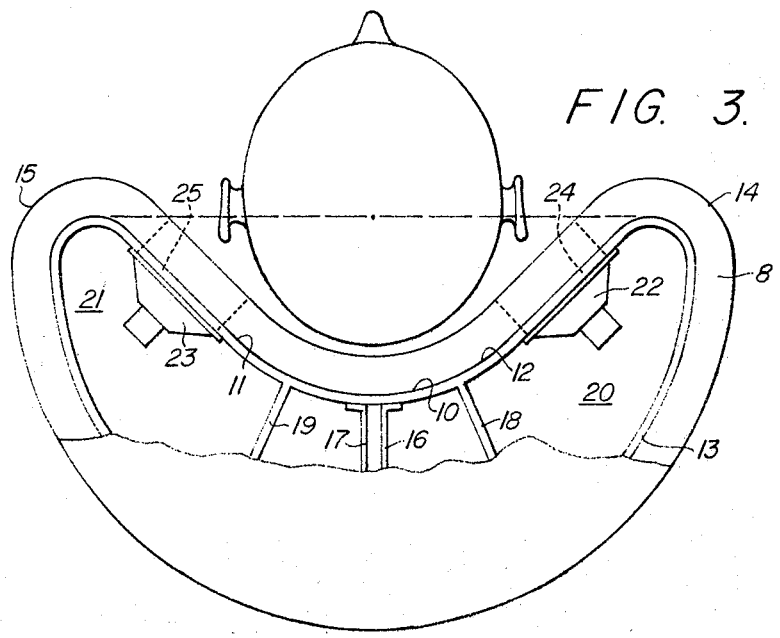
FIG. 3.

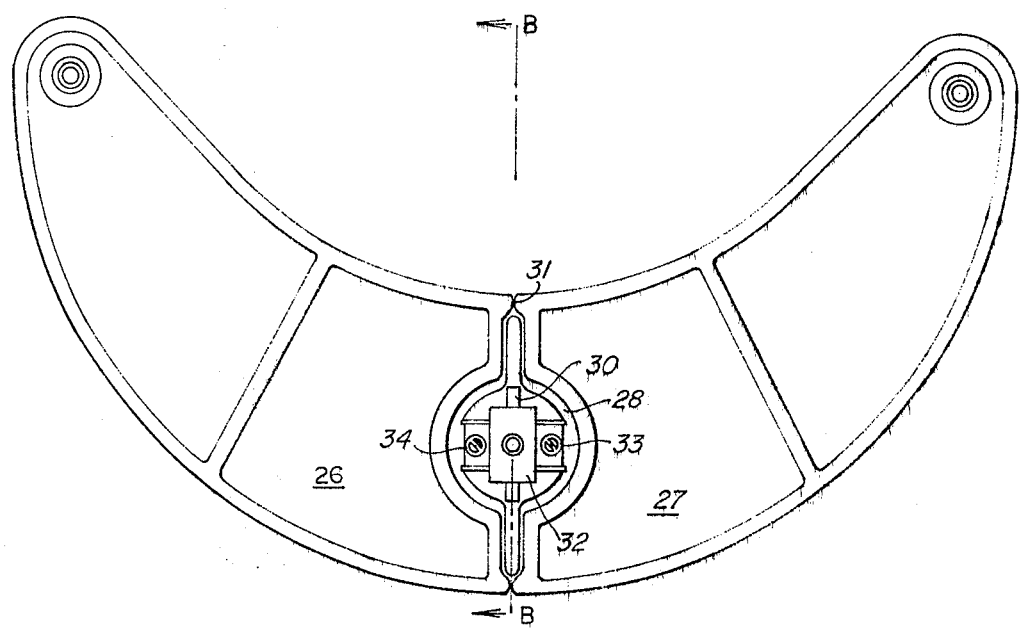
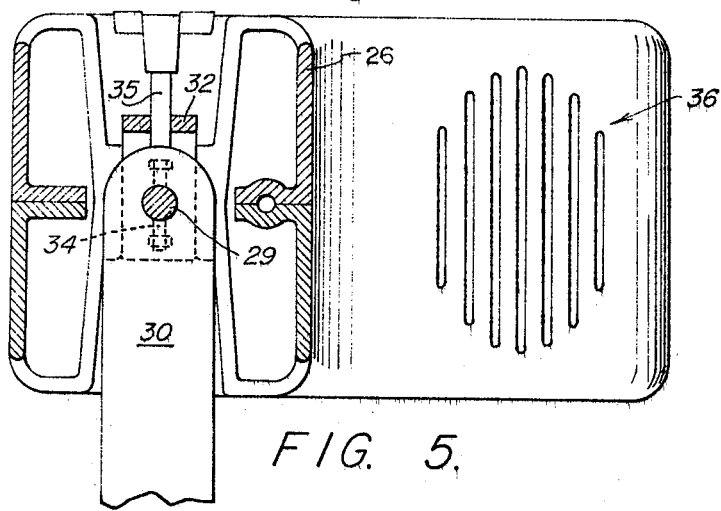
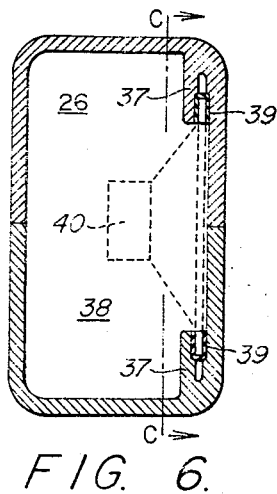
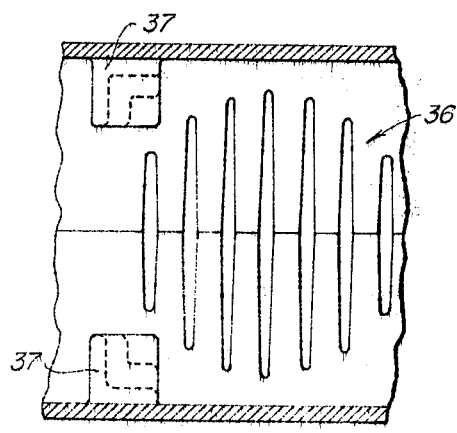

SPEAKER HEADREST FOR MOTOR VEHICLES

BACKGROUND OF THE INVENTION

Headrests containing speakers are known. Exemplary patents relating to speaker headrests for passenger vehicles are those to McCorkle, U.S. Pat. No. 3,512,605; Taylor, U.S. Pat. No. 2,908,766; and Gold, U.S. Pat. No. 3,385,393. The patent to Taylor relates to a slip-cover type device intended to slip over the back of the seat, such as an airplane seat, said slip-cover having two opposed pockets to accommodate a pair of speakers.

The patent to Gold relates to a cylindrical type headrest having a speaker enclosed at one end thereof. A hollow tube in the center of the headrest supports the speaker and is open at the opposite end to permit sound from a single speaker to be emitted from the end of the headrest opposite the speaker also. Only a single speaker is utilized in the headrest of Gold. Insertion of a second speaker at the opposite end of the central tube would not provide good stereophonic sound reproduction since both speakers would share a common acoustical passageway and would further be directing transmitted sound away from one another.

The McCorkle patent relates to a stereo speaker headrest for an automobile seat wherein a pair of opposed speakers are enclosed in a body of resilient material which is adapted to slip over attachment means to attach the speaker to the vehicle seat. The speaker headrest of McCorkle is padded only in a central area and apparently has side members which are supported only by a thin section of resilient material.

Stereo speaker headrests have been devised for various types of chairs or seats. U.S. Pat. No. 3,230.320 to Kerr relates to a dental chair having a curved headrest containing opposed speakers. U.S. Pat. Nos. 2,464,435 and 2,452,103 to Conradt relate to a stereo speaker device which can be temporarily attached to the back of a seat. Patents to Christie, U.S. Pat. No. 3,416,804; Lanzara, U.S. pat. No. 3,384,719; and Majoros, U.S. Pat. No. 3,290,450, relate to pillow-type devices upon which ones head can be rested and which contain a pair of speakers.

SUMMARY OF THE INVENTION

The following are the objects of the instant invention:

To provide a stereo speaker headrest for vehicles wherein the speakers are directed toward the occupant of the vehicle seat;

To provide a stereo speaker headrest which provides safety to the occupant of the seat;

To provide a stereo speaker headrest having large, individual, acoustic chambers for each speaker;

To provide a stereo speaker headrest having impact resistant wing members;

To provide a stereo speaker headrest having a removable padded cover.

These and other objects of the present invention are realized in an illustrative embodiment of a stereophonic speaker headrest which has a rigid interior shell having a pair of opposed side wing members, each defining an acoustic chamber and each containing speaker attachment elements for holding a speaker in each wing. The interior shell is enclosed within a padded cover which provides substantial padding on at least the front and rear surfaces of the shell including the area in front of the speakers. The headrest is attached to the top or the back of a vehicle seat.

BRIEF DESCRIPTION OF THE DRAWINGS

The above and other objects, features and advantages of the present invention will become apparent from a consideration of the following detailed description presented in connection with the accompanying drawings which:

FIG. 1 is a perspective view showing the underneath side of a speaker headrest made in accordance with the principles of the present invention;

FIG. 2 is a sectional view of the speaker headrest of FIG. 1 taken along lines A—A of FIG. 1;

FIG. 3 is a top partially cutaway view of the speaker headrest of FIG. 1;

FIG. 4 is a top sectional view of an alternative embodiment of a speaker headrest made in accordance with the principles of the present invention;

FIG. 5 is a sectional view of the headrest of FIG. 4 taken along lines B—B of FIG. 4;

FIG. 6 is a sectional view of one wing of the headrest of FIG. 4; and

FIG. 7 is a fragmented view of a speaker grill-work and tabs taken along lines C—C of FIG. 6.

DETAILED DESCRIPTION

Referring to FIGS. 1–3, there is shown a speaker headrest constructed of a one-piece headrest shell 6 covered by padding 8. The shell 6 is shaped to define a cup area 10 and inward facing wall surfaces 11 and 12 of a pair of opposed wing members. The rear wall of the one-piece headrest shell is an arcuate surface 13 which is defined by a radius of about 7½ to about 9½ inches so that the maximum width of the headrest from one shell wing to the other shell wing is from about 15 to about 19 inches. As illustrated in FIG. 3, a radius of about 8⅝ inches is preferred for the rear wall member, said radius having its center at a point between the cup surface and a plane tangential to the tips of the opposed wings. The center of the radius is preferably closely adjacent to a plane which is tangential to the shell wing tips.

The cup area 10 has an arcuate surface which is defined by a radius of about 4½ to about 6 inches and preferably about 5 to about 5½ inches, said radius having a center which is located closely adjacent to a plane tangential to each shell wing tip. The wing tips of the interior shell are preferably rounded so that no sharp edges are present where the head of the vehicle occupant could come in contact with it.

The arcuate surface of the cup area 10 extends about one-quarter of a circle, that is, it is described by an arc of 90°, so that it squarely meets the flat surfaces 11 and 12 of the wing members. Thus, the wing surfaces are at an angle of about 90° to one another. This angle may be varied somewhat, although it is generally preferred that the angle between the frong wing surfaces be between about 75° and 100°.

The rigid interior shell has three interior web supports. The central web support is composed of two walls 16 and 17 with a space therebetween to accommodate means for attaching the headrest shell to a vehicle seat. The double-walled, central web member is preferred when a single post is utilized to attach the headrest shell to a vehicle seat. If a pair of posts are utilized for this purpose, then the central web member may be a single wall, or it may be entirely eliminated by having the support posts attached to angularly displaced webs 18 and 19. The web members provide rigidity to the front and rear wall members. The angularly displaced web members 18 and 19 are preferably located in the cup area, that is, the web members 18 and 19 are preferably displaced from one another at an angle not exceeding 90° and preferably at an angle of about 45° to 70°. This angular displacement is preferred inasmuch as the web members are intended to give maximum support in the cup area and also to provide acoustic chambers 20 and 21 which are defined by the void enclosed between the front and rear walls and the web members of each wing. The web members are preferably solid so that the acoustic chambers are acoustically isolated from one another. Each acoustic chamber is preferably as large as possible to provide improved reproduction of sound from speakers 22 and 23 contained within the acoustic chambers and adjacent to front walls 11 and 12 of the wing members.

The stereo speaker headrest of the instant invention is constructed so that the opposed speakers 22 and 23 are closely adjacent to the ears of the seat occupant with the sound being directed towards the seat occupant so that sound emanating perpendicularly from the speaker surface intersects sound emanating perpendicularly from the other speaker surface at an included angle not less than about 80° and preferably not more than about 105°.

The design of the stereo headrest is such that the headrest does not interfere with the peripheral vision of a seat occupant. As illustrated in FIG. 3, even when the head of the seat occupant is resting against the padded cover 8 of the interior shell, the tips of the wing members are substantially in alignment with the ears of the occupant and are at an angle of about 20° to the rear of the eyes of the seat occupant. As further illustrated by FIG. 3, the padded cover provides padding about the entire periphery of the front and rear surface of the headrest so that the head of an occupant is protected no matter where it strikes the headrest, even in the speaker area. Also, as illustrated by FIG. 3, the speaker openings 24 and 25 are smaller than the diameter of the speakers so that the speakers cannot be propelled towards the seat occupant regardless of the type of impact which the vehicle receives.

Illustratively, the padded cover 8 could be made of foam rubber or other suitably resilient material suitable for cushioning the head of the seat occupant from impact by the headrest shell 6.

The angular displacement between wing wall surfaces 11 and 12 is such that if struck by the head of an occupant who is not sitting in the center of the vehicle seat, the head of the occupant would be directed toward the cup area 10. The wing members are sufficiently strong not to be broken by an impact at the wing front surface area, for example, in the area of the speaker, and any direct rearward force has a substantial vector along the wing front surface because of its angular position, thus permitting the head of an occupant which has struck the headrest to slide along the front wing surface into the cup area. The cup area is designed with a radius of curvature which approximates the curvature of the back of the human head so that the pressure upon the head of an occupant striking the headrest is substantially uniform, thereby minimizing the danger of skull fracture even when the impact is very great.

An alternative structure is illustrated in FIGS. 4 through 7. In the structure illustrated in FIGS. 1 through 3, a one-piece construction was involved whereby a flat cover plate of wood, plastic or metal could be utilized to cover the open base of the headrest. The headrest illustrated in FIGS. 4 through 7 is symmetrical about a plane passed vertically through the center of the front and rear surfaces and about a plane passed horizontally through the center of the front and rear surfaces. The structure is advantageous in its manufacture and offers easy assembly and a secure means of holding the speakers in place.

The structure comprises an upper left segment 26, an upper right segment 27, a lower left segment and a lower right segment. Because of the symmetry of the structure, the lower left segment and the upper right segment are identical structurally while the lower right and upper left segments are identical in structure. Thus, the complete headrest may be assembled from two component parts, one part being used as either the upper left or lower right segment and the other part being used as the upper right or lower left segment.

A central opening through the units provides access for structure for attaching the headrest to a vehicle seat. The central opening may be any shape, including a slot-shape or a cylindrical shape 28 as illustrated in FIG. 4. The central area is also slotted as illustrated at 31 in FIG. 4 to accommodate a particular attachment structure whereby the headrest may tilt about a pin 29 (FIG. 5) which secures the headrest to a single post support 30 attaching the headrest to a vehicle seat. The slot 31 exists in both the upper and lower surface of the headrest inasmuch as the headrest segments are symmetrical in construction. The particular attachment structure for attaching the headrest to a vehicle seat, as illustrated in FIGS. 4 and 5, includes a yoke 32 which bridges over and straddles the post 30 and is secured to pin 29. The pin 29 is held immovable and secured to the upper left and right and lower left and right segments of the headrest by bolts 33 and 34. A threaded adjustment rod 35 passes through a threaded bore in the yoke 32 to press against the upper surface of support post 30 to hold the headrest in a particular tilt position.

As illustrated in FIG. 5, the speaker is preferably positioned behind a grill-work 36 which has sufficient structural integrity to prevent the speaker from being propelled through the wall of the rigid interior shell regardless of the severity of the blow received by the shell.

As illustrated in FIGS. 6 and 7, the speaker is held in place without the use of any screws, bolts or the like, by the slotted tabs 37 which are grooved to accept the rim of the speaker in position so that the speaker is supported laterally as well as vertically so that when top segment 26 and lower segment 38 are joined the speaker is clamped in an immovable position as shown by dotted line 40 in FIG. 6. Lining the slotted tabs with rubber inserts 39 cushions the contact of the speaker with the housing, thereby precluding transmission of vibrations from the housing to the speaker or vice versa.

It is to be understood that the above-described arrangement is only illustrative of the application of the principles of the present invention. Numerous other modifications and alternative arrangements may be devised by those skilled in the art without departing from the spirit and scope of the present invention and the appended claims are intended to cover such modifications and arrangements.

What is claimed is:

1. A stereo speaker headrest for a vehicle comprising a rigid interior shell having a pair of side wing members, each having a speaker opening, and a substantially arcuate central front surface, speaker attachment means for holding a pair of speakers such that each speaker is adjacent a different one of said speaker openings and such that the speakers are displaced laterally from one another, each wing member containing a speaker attachment means, an acoustical chamber defined by the walls of each wing member, a padded cover for substantially covering at least the front and rear surfaces of said rigid interior shell, and attachment means for attaching said headrest to a vehicle seat.

2. The headrest of claim 1 wherein said interior shell has a substantially arcuate rear surface, said rear surface having a substantially larger radius of curvature than said front surface.

3. The headrest of claim 2 wherein said wing members have substantially flat front surfaces having an included angle therebetween of about 80° to about 100°.

4. The headrest of claim 1 wherein said interior shell has front, back, top and bottom walls forming a substantially enclosed cavity.

5. The headrest of claim 2 wherein said interior shell is substantially symmetrical about a vertical plane passed through the front and back at the midpoint of the headrest and is substantially symmetrical about a horizontal plane passed through the front and back at the midpoint of the headrest.

6. The headrest of claim 5 wherein said headrest shell is composed of four component parts.

7. The headrest of claim 6 wherein said two of said components are identical in structure and the remaining two are identical in structure, being substantially a mirror image of the structure of the first pair.

8. The headrest of claim 7 wherein one component from each pair of identical components are joined to form one-half of the headrest and the remaining two components are joined to form the other one-half of the headrest.

9. The headrest of claim 8 wherein the different components joined together have web members therein which combine with the walls of the components to define an acoustic chamber.

10. The headrest of claim 4 wherein said interior shell has at least one interior web member abutting the front, back, bottom and top walls to separate said interior shell into two enclosed, acoustic chambers.

* * * * *